Feb. 16, 1954 K. J. AVERSTEN 2,669,638
ARRANGEMENT FOR MEASURING ELECTRIC ENERGY
IN SHORT DURATION TIME INTERVALS
Filed March 13, 1950

INVENTOR
KARL JOEL AVERSTEN,
BY
ATTORNEY

Patented Feb. 16, 1954

2,669,638

UNITED STATES PATENT OFFICE 2,669,638

ARRANGEMENT FOR MEASURING ELECTRIC ENERGY IN SHORT DURATION TIME INTERVALS

Karl J. Aversten, Lidingo, Sweden, assignor to Svenska Aktiebolaget Gasaccumulator, Lidingo, Sweden, a corporation of Sweden Application March 13, 1950, Serial No. 149,434

Claims priority, application Sweden December 16, 1949

2 Claims. (Cl. 219—4)

In electric welding processes of short duration, as in spot, plug, stud, butt or flash welding or similar processes, use is made of various types of control devices for allowing the passage of the welding current only for the time required for a satisfactory weld. Such devices are usually provided with adjusting arrangements for adjusting the interval after which it is desired that the device should break the current. For instance, a relay may be adapted to actuate, at the end of the interval referred to, a circuit breaker. The operation of such devices is based on the assumed constancy of the rate at which energy from the current source is consumed at the welding point. If, however, the current source supplies energy at a varying rate and the length of the interval is kept constant it is not possible to ensure a satisfactory weld, for the variations in power referred to may cause the amount of melt produced at the welding point to be too great or too small.

According to the present invention the length of the interval is controlled in dependence upon the power consumed, so that if the power decreases the length of the interval will increase and vice versa, whereby a constant amount of energy is applied to the weld. This is achieved, according to the invention, by applying the current through a conductor which is suitably proportioned with regard to the energy to be applied in such a way as to melt off when this amount of energy has passed through it, thereby breaking the current.

Figure 1:
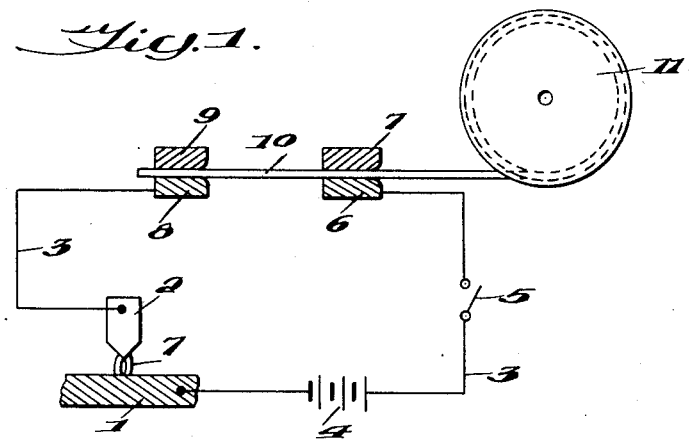
Figure 2:
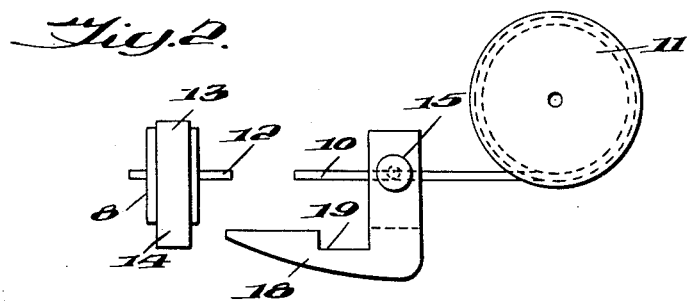

The invention will be set forth in more detail in connection with the drawings, showing some embodiments thereof. Fig. 1 is a schematic diagram of a welding arrangement according to the invention, Fig. 2 shows, in elevation, part of the arrangement after a welding operation has been completed, Fig. 3 a vertical section corresponding to Fig. 2, and Fig. 4 shows the relative positions of some details of the arrangement during the preparation of a subsequent welding operation.

As shown in Fig. 1, a workpiece 1 and an electrode 2 are included in a circuit with a conductor 3, a battery 4 and a switch 5. The circuit further comprises a pair of spring-urged contact blocks 6 and 7 and a similar pair of blocks 8 and 9, spaced from the first pair. A comparatively fine-gage fuse wire 10 of silver, copper or the like is wound on a drum 11 and extends between the blocks as shown, the wire thus carrying the current flowing in the circuit.

The arrangement operates as follows. When switch 5 is closed and electrode 2 brought near to the workpiece, current passes from battery 4 through conductor 3, blocks 6 to 9, wire 10, conductor 3, electrode 2 and the workpiece. If the electrode 2 is removed slightly from the work an arc is struck and produces the heat energy required for the weld, whereupon the electrode may be attached to the work by pressure.

The wire 10 should be of sufficiently fine gage that the heating of the wire portion between the pairs of blocks is sufficient for bringing the midportion of the wire to melting, thereby rupturing the wire and cutting off the current. By suitable choice of the gage of wire it is possible to determine the time required for the wire to rupture. To ensure a satisfactory weld, it is required to apply a predetermined amount of energy to the welding area. If this amount is either too great or too small, the quality is impaired. The correct gage to be used is that which allows the correct amount of energy to be developed. If standard type control devices are used, which cut off the current after a predetermined interval, the welding process will be dependent upon possibly occurring fluctuations in the current applied, so that, for instance, if the current is lower than the expected value, the amount of energy applied is too small, thus impairing the weld. According to the invention, however, the current is interrupted in dependence upon the amount of energy applied, i. e. if the power consumed in the welding area is altered, the time required until the wire ruptures, and therefore the welding interval, varies accordingly so as to make the amount of energy applied have a uniform value.

Since the wire rupture breaks the circuit, switch 5 is required only for closing it. No inconvenience is therefore caused by arcing at the breaking of the current, wherefore switch 5 may be of lighter construction than if it had to serve also for breaking, as in ordinary type devices. This is of particular importance in portable devices.

The electrode 2 may comprise a stud or the like to be attached to the work, for which case the stud may be supported and handled by means of a welding gun having an integral switch replacing switch 5 in Fig. 1.

The fuse wire 10 may be of practically any metal obtainable with uniform electric properties. However, as the arrangement is preferably intended for use at high amperage currents, the wire should have low resistance in order to keep down dimensions.

Figure 3:
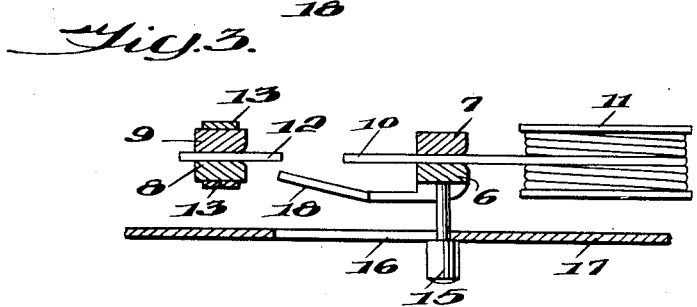
Figure 4:
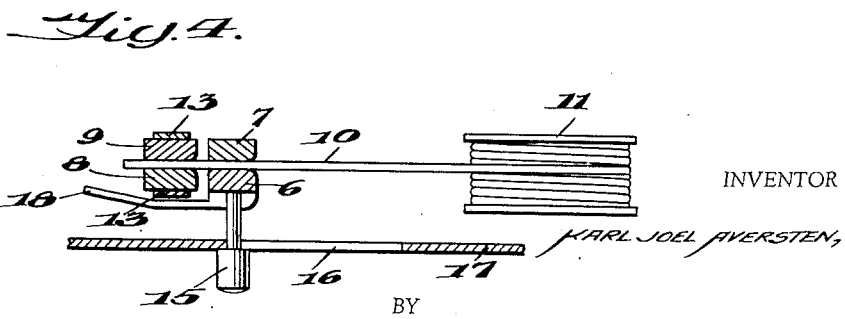

When a welding operation has been completed, wire 10 has thus burned off between the blocks, as shown in Figs. 2 and 3, and a stump of wire 12 will remain between blocks 8 and 9. These blocks are held together by means of a leaf spring 13 having a downward extension 14. The remaining blocks 6 and 7 are supported by an adjusting peg 15 movable in a slot 16 provided in a fixed plate 17 in such a way that the spacing between the pairs of blocks may be adjusted by means of peg 15. On the lowermost part of block 6 there is provided a jaw 18, which is adapted, when the pairs of blocks are brought together, to enter within extension 14 of spring 13 and thereby urge blocks 8 and 9 apart. Jaw 18 further has a notch 19 allowing passage of the end of extension 14.

When the operator desires to perform a second welding operation, upon rupture of wire 10, he grips adjusting peg 15 and by means of it displaces blocks 6 and 7 to the left as viewed in Figs. 2 and 3. Jaw 18 then enters within extension 14 and forces spring 13 outward, thus urging blocks 8 and 9 apart, which causes the stump of wire 12 to drop out. Further displacement of blocks 6 and 7 brings the free end of wire 10 between the open pair of blocks 8 and 9 and when notch 19 has reached extension 14, this moves into the notch, the blocks 8 and 9 are brought together and the wire end is locked between them as illustrated in Fig. 4. Blocks 8 and 9 are assumed to exert more pressure on the wire than blocks 6 and 7, so that when these are moved to the right to the end position shown in Figs. 1 to 3 the wire remains locked by blocks 8 and 9. Wire 10 is then tautened and a predetermined length thereof is included in the welding current circuit. The preparation of the arrangement for a subsequent weld is thus performed simply by a single to and fro movement of adjusting peg 15.

The gage of wire 10 must be determined by tests made beforehand, so as to make it suitable for the amperage and type of welding operation desired. This is feasible, since ordinarily a number of similar welds are to be made. The wire may be replaced by a thin ribbon. This provides a simple means by which to vary the amount of energy allowed to pass by the ribbon before rupturing.

The control arrangement has been shown included in the welding current circuit. In alternating current welding a transformer may be used to the primary of which is applied high-voltage low-amperage current and the secondary of which delivers low-voltage high-amperage current. The control arrangement may then be included in circuit with the primary whereby small dimensions may be ensured. Further modifications of the arrangement are possible within the scope of the invention. For instance, the arrangement may be used not only for welding purposes but in any case where it is desired to allow the passage of a predetermined amount of energy during a short interval.

What is claimed is:

1. An arrangement for determining the time for arc welding during short time intervals comprising a welding circuit, a fusible conductor disposed in said circuit, means for supplying electric energy to said circuit so that all electric energy supplied for welding will pass through said conductor, said conductor having a resistivity and being dimensioned so as to reach, after the passage therethrough of the electric energy for welding, a temperature sufficient to cause rupture by melting, and two pairs of contact-making blocks, each pair being adapted to grip said conductor, and one of said pairs being adapted to exert a smaller gripping pressure than the other pair and being displaceable relative thereto, so as to vary the spacing between said pairs of blocks.

2. An arrangement for determining the time for arc welding during short time intervals, comprising a welding circuit, a battery as a direct current source in the welding circuit, one terminal of the battery adapted to be connected with the work and the other terminal connected through a switch to a first pair of blocks, a fuse conductor passing from said first pair of blocks to a second pair of blocks, and a conductor from said second pair of blocks to a welding electrode, said fuse conductor having such dimensions and resistivity with regard to the amount of electric energy from the current source that the conductor will fuse after a passage therethrough of sufficient amount of electric energy for welding.

KARL J. AVERSTEN.

References Cited in the file of this patent

UNITED STATES PATENTS

| Number | Name | Date |
|---|---|---|
| 438,721 | Whittingham | Oct. 21, 1890 |
| 499,485 | Voorhees | June 13, 1893 |
| 1,684,108 | Phelps | Sept. 11, 1928 |

FOREIGN PATENTS

| Number | Country | Date |
|---|---|---|
| 450,939 | Great Britain | July 24, 1936 |